(12) United States Patent
Bergum et al.

(10) Patent No.: US 7,513,324 B2
(45) Date of Patent: Apr. 7, 2009

(54) CHILDREN'S RIDE-ON VEHICLES HAVING BATTERY CHARGE INDICATOR ASSEMBLIES

(75) Inventors: Mark J. Bergum, Clarence, NY (US); Kurt J. Huntsberger, Chaffee, NY (US)

(73) Assignee: Mattel, Inc., El Segundo, CA (US)

( * ) Notice: Subject to any disclaimer, the term of this patent is extended or adjusted under 35 U.S.C. 154(b) by 604 days.

(21) Appl. No.: 11/213,072

(22) Filed: Aug. 26, 2005

(65) Prior Publication Data

US 2007/0045013 A1    Mar. 1, 2007

(51) Int. Cl.
*B60K 1/00* (2006.01)
(52) U.S. Cl. .................. 180/65.1; 180/908; 446/465
(58) Field of Classification Search ............. 180/65.1, 180/908; 446/465
See application file for complete search history.

(56) References Cited

U.S. PATENT DOCUMENTS

| | | | |
|---|---|---|---|
| 945,564 A | 1/1910 | Marko | |
| 964,995 A | 7/1910 | Marko | |
| 2,609,409 A | 9/1952 | Radeke | |
| 2,672,499 A | 3/1954 | Radeke | |
| 2,991,413 A | 7/1961 | Taylor | |
| 3,061,827 A | 10/1962 | Fiandt et al. | |
| 3,065,827 A | 11/1962 | Timbers | |
| 3,118,137 A | 1/1964 | Vincent | |
| 3,383,580 A | 5/1968 | Wallace, Jr. | |
| 3,392,328 A | 7/1968 | Figg | |
| 3,401,337 A | 9/1968 | Beusman et al. | |
| 3,408,973 A | 11/1968 | Curtis et al. | |
| 3,593,099 A | 7/1971 | Scholl | |
| 3,600,234 A | 8/1971 | Massie, Jr. | |
| 3,818,325 A | 6/1974 | Boshers | |
| 3,974,441 A | 8/1976 | Van Den Haak | |
| 4,134,060 A | 1/1979 | Feldman | |
| 4,137,493 A | 1/1979 | Smith | |
| 4,289,836 A | 9/1981 | Lemelson | |
| 4,625,175 A | 11/1986 | Smith | |
| 4,692,680 A | 9/1987 | Sherer | |

(Continued)

OTHER PUBLICATIONS

International Search Report, Aug. 29, 2008, 2 pages, U.S. Patent and Trademark Office.

(Continued)

*Primary Examiner*—Christopher P Ellis
*Assistant Examiner*—Brian Swenson
(74) *Attorney, Agent, or Firm*—Kolisch Hartwell, P.C.

(57) ABSTRACT

Children's ride-on vehicles having charge indicator assemblies that are adapted to provide at least a visual indication of the state of charge of the ride-on's battery assembly. The vehicles are reduced-scale vehicles, often formed substantially from molded plastic, that are sized for use by children and which include battery-powered motor assemblies. The vehicles include a charge indicator assembly that is adapted to selectively assess an input voltage from the battery assembly and provide an output representative of the relative state of charge of the battery assembly. In some embodiments, the charge indicator assembly includes a charge indicator module that is mounted on the vehicle's body, optionally in a position to be accessed by a child operating the ride-on, and which includes a button or other actuator adapted to cause the charge indicator assembly to assess the state of charge of the battery assembly.

19 Claims, 5 Drawing Sheets

U.S. PATENT DOCUMENTS

| | | | |
|---|---|---|---|
| 5,130,659 A | 7/1992 | Sloan | |
| 5,159,272 A | 10/1992 | Rao et al. | |
| 5,434,494 A * | 7/1995 | Perego | 320/111 |
| 5,496,658 A | 3/1996 | Hein et al. | |
| 5,519,383 A | 5/1996 | De La Rosa | |
| 5,656,919 A * | 8/1997 | Proctor et al. | 320/153 |
| 5,685,734 A | 11/1997 | Kutz | |
| 5,895,440 A | 4/1999 | Proctor et al. | |
| 5,933,010 A | 8/1999 | Moreno | |
| 5,934,694 A | 8/1999 | Schugt et al. | |
| 5,937,622 A | 8/1999 | Carrier et al. | |
| 5,963,013 A | 10/1999 | Watson et al. | |
| 6,276,975 B1 | 8/2001 | Knight | |
| 6,323,650 B1 | 11/2001 | Bertness et al. | |
| 6,509,719 B2 * | 1/2003 | Crofut et al. | 320/134 |
| 6,542,077 B2 | 4/2003 | Joao | |
| 6,633,165 B2 | 10/2003 | Bertness | |
| 6,707,303 B2 | 3/2004 | Bertness et al. | |
| 6,850,037 B2 | 2/2005 | Bertness | |
| 7,012,515 B2 * | 3/2006 | Yamamoto et al. | 340/475 |

OTHER PUBLICATIONS

Written Opinion, Aug. 29, 2008, 3 pages, U.S. Patent and Trademark Office.

* cited by examiner

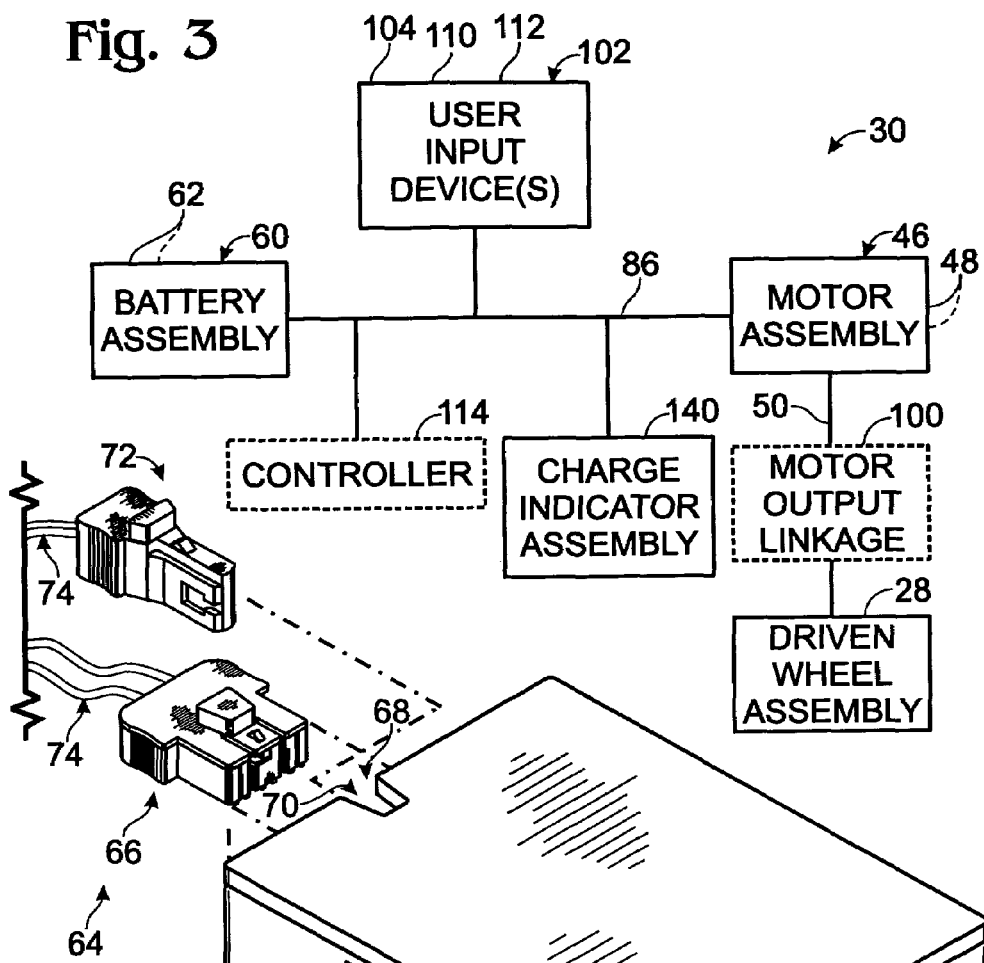
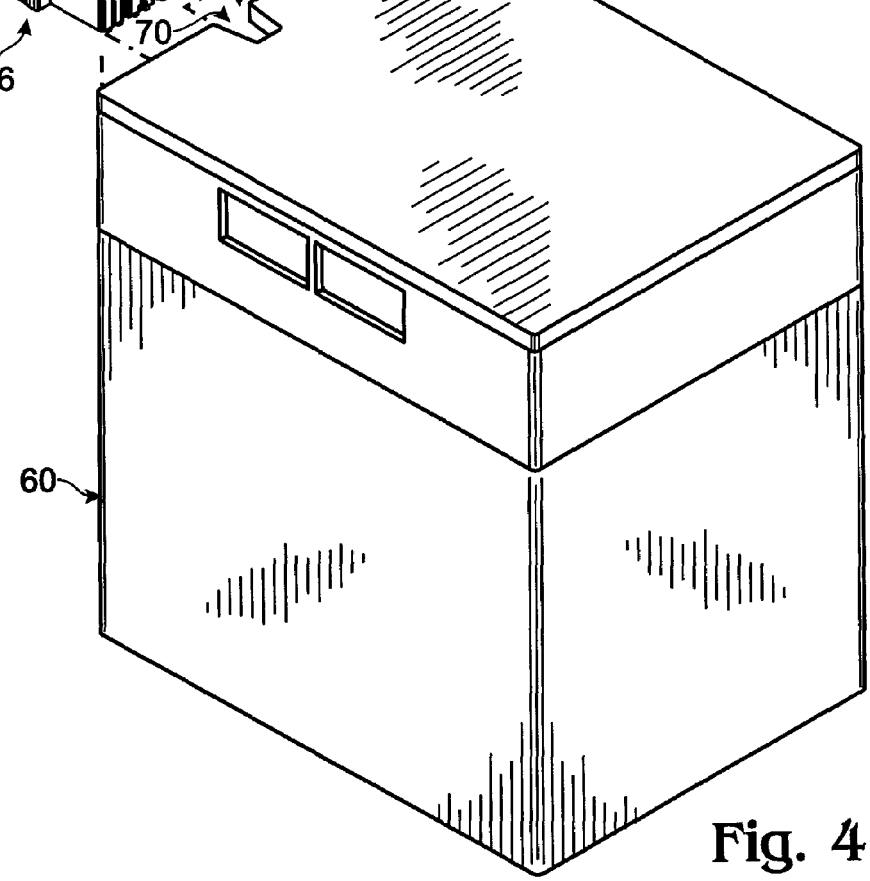
Fig. 3
Fig. 4

CHILDREN'S RIDE-ON VEHICLES HAVING BATTERY CHARGE INDICATOR ASSEMBLIES

TECHNICAL FIELD

The present disclosure relates generally to children's ride-on vehicles, and more particularly to battery-powered children's ride-on vehicles and battery charge indicator assemblies for use with such vehicles.

BACKGROUND OF THE DISCLOSURE

Children's ride-on vehicles are reduced-scale vehicles that are designed for use by children. For example, children's ride-on vehicles include a seat adapted to accommodate one or more children and steering and drive assemblies that are adapted to be operated by a child sitting on the seat. One type of drive assembly that is often used in children's ride-on vehicles includes a battery-powered motor assembly that is adapted to drive the rotation of one or more of the vehicle's wheels. The motor assembly is powered by a battery assembly, which may include one or more rechargeable batteries. Typically, the vehicle will include an actuator, such as a foot pedal, push button or other user input device, which enables a child to select when power is delivered to the motor assembly. Some drive assemblies further include other user input devices, such as a speed selector and/or a direction selector, which are operated by a child sitting on the vehicle's seat to select the speed and direction at which the vehicle travels.

The rechargeable battery of a children's ride-on vehicle is typically installed in a battery compartment of the vehicle when in use, and may be removable for storage or recharging. The rechargeable battery is selectively charged by disconnecting the battery from the ride-on's drive assembly and connecting the battery to a charging unit, which typically includes an AC adapter and a suitable charging plug, probe, or other connector that is adapted to interconnect with the rechargeable battery. A ride-on vehicle may be operated continuously for several hours on a fully charged battery. However, conventional ride-ons lack a mechanism for providing an indication of the state of charge of the battery assembly, much less such an indicator that does not require disconnecting of the battery assembly from the ride-on's drive assembly and/or removal of the battery assembly from the ride-on's battery compartment.

BRIEF DESCRIPTION OF THE DRAWINGS

FIG. 3 is a schematic diagram of a suitable drive assembly for the children's ride-on vehicle of FIG. 1.

FIG. 4 is a perspective view of an illustrative battery assembly with portions of the vehicle's wiring harness and charger shown in fragment.

DETAILED DESCRIPTION AND BEST MODE OF THE DISCLOSURE

Figure 1:
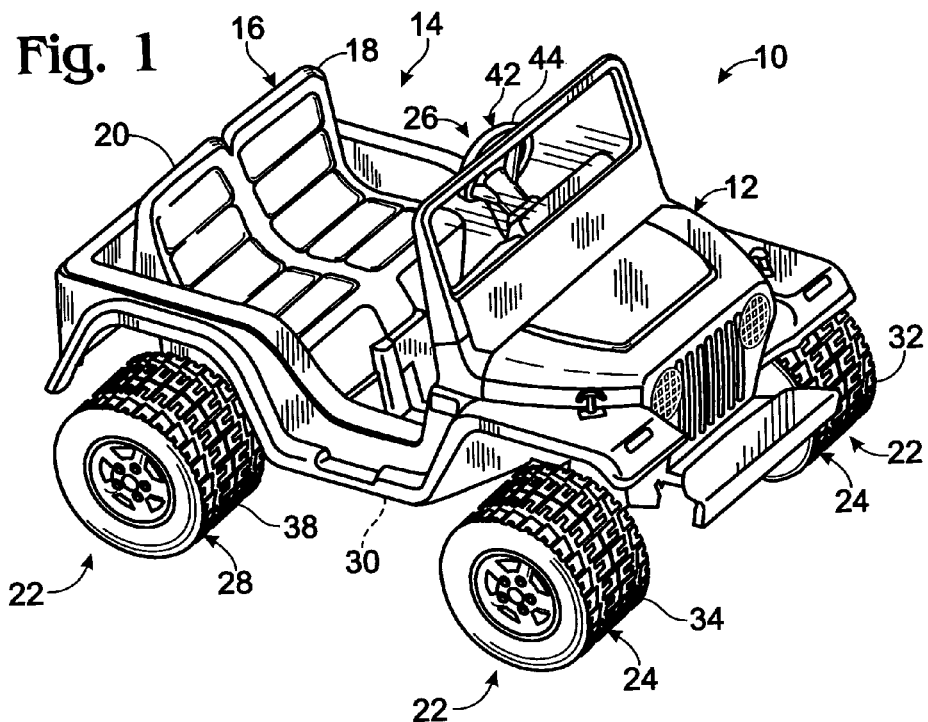
FIG. 1 is a perspective view of a children's ride-on vehicle.

An illustrative example of a children's ride-on vehicle is shown in FIG. 1 and indicated generally at 10. Ride-on vehicle 10 includes a support frame, or body, 12 that provides a riding space, or passenger compartment, 14 with a seat assembly 16 that is sized and configured to accommodate at least one child, including a child driver. Seat assembly 16 may be integral with or otherwise mounted on body 12 and may have any suitable configuration, including configurations in which the position of the seat assembly is adjustable within the passenger compartment, and configurations in which the seat assembly includes two or more seats or two or more seating regions. Typically, vehicle 10 will be sized for use by a child driver or by a child driver and a child passenger. For example, in the illustrated embodiment, seat assembly 16 includes a pair of seats, or seating regions, 18 and 20, with seat 18 sized and positioned to receive a child driver and seat 20 sized and positioned to receive a child passenger.

Body 12 typically is formed from molded plastic and may be integrally formed or formed from a plurality of parts that are secured together by screws, bolts, clips or other suitable fasteners. Body 12 may additionally, or alternatively, be at least partially formed from other suitable material(s), such as metal, wood, or composite materials. Body 12 may include an underlying frame on which a chassis is mounted. In such an embodiment, the frame is often formed of metal and/or molded plastic, with the chassis typically formed of molded plastic.

As shown, body 12 is shaped to generally resemble a reduced-scale Jeep® vehicle. JEEP is a registered trademark of the Diamler Chrysler Corporation, and the JEEP mark and designs are used by permission. Children's ride-on vehicles according to the present disclosure may be shaped to generally resemble any type of vehicle. Examples of suitable vehicles are reduced-scale, or child-sized, vehicles that are shaped to resemble corresponding full-sized, or adult-sized, vehicles, such as cars, trucks, construction vehicles, emergency vehicles, off-road vehicles, motorcycles, space vehicles, aircraft, watercraft and the like. However, it is also within the scope of the present disclosure that vehicle 10 may be shaped to resemble fantasy vehicles that do not have a corresponding adult-sized counterpart. Although vehicle 10 is depicted in the form of a reduced-scale Jeep® vehicle, it will be appreciated that the components and/or features of vehicle 10, including the subsequently described charge indicator assembly, may be configured for use on any type of children's ride-on vehicle having one or more powered components.

Figure 2:
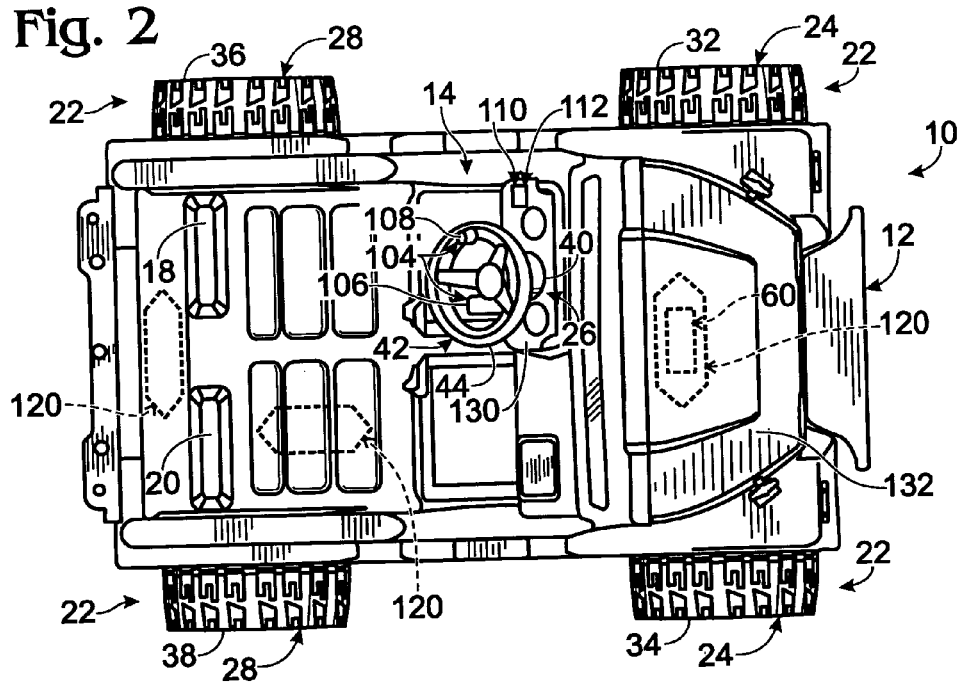
FIG. 2 is a top plan view of the children's ride-on vehicle of FIG. 1.

Body 12 also includes a plurality of wheels 22 that are rotatably coupled to body 12, as indicated in FIGS. 1-2. The plurality of wheels includes a steerable wheel assembly 24 that contains at least one steerable wheel that is adapted to be steered by the vehicle's steering assembly 26, typically at least partially in response to user-imparted steering inputs thereto. The plurality of wheels further includes a driven wheel assembly 28 that contains at least one driven wheel that is adapted to be rotationally driven by the vehicle's drive assembly 30. As used herein, the term "driven wheel" refers to a wheel that is rotated directly in response to a rotational input from the vehicle's drive assembly, which is either directly conveyed to the wheel by the output of the motor assembly or conveyed through a linkage, such as a gearbox, belt, chain, gear assembly, axle, or the like. In the illustrated embodiment, vehicle 10 includes four wheels 22, with front wheels 32 and 34 forming steerable wheel assembly 24, and rear wheels 36 and 38 forming driven wheel assembly 28. The number of wheels on the vehicle may vary from two wheels to four, six or more wheels, although children's ride-on vehicles typically include at least three wheels for stability. Similarly, each wheel assembly must contain at least one wheel, and a particular wheel may form all or a portion of both the steerable wheel assembly and the driven wheel assembly. For example, it is within the scope of the disclosure that either or both of front wheels 32 and 34 or rear wheels 36 and 38 are driven and steerable. Similarly, one front wheel and one rear wheel may be driven and/or steerable, or the vehicle may include one or more driven or steerable wheels underneath its body that are generally hidden by the body of the vehicle.

A portion of the vehicle's steering assembly 26 is shown in FIGS. 1 and 2 and includes a steering column 40 (indicated in FIG. 2) and a steering mechanism 42. The steering assembly enables a child sitting on seat 18 to steer the vehicle's steerable wheel assembly 24 via user-applied steering inputs to steering mechanism 42, which is positioned on vehicle 10 for operation by a child sitting on seat 18. In the illustrated embodiment, steering mechanism 42 takes the form of a steering wheel 44. Other suitable structures, such as handlebars and steering levers, may be used and are within the scope of the present disclosure. Steering column 40 includes any suitable mechanical linkage that conveys a child's steering inputs from the steering mechanism to the vehicle's steerable wheel assembly, thereby steering the vehicle.

In FIG. 3, an example of a suitable drive assembly 30 for a children's ride-on vehicle, such as vehicle 10, is schematically illustrated. Drive assembly 30 is adapted to drive the rotation of driven wheel assembly 28. The drive assembly includes a motor assembly 46, which includes at least one electric motor 48 that is adapted to drive the rotation of at least one of the driven wheels of the plurality of wheels. The motor assembly includes an output 50 that provides a rotational input to the driven wheel assembly. Typically, the output 50 from each of the one or more motors includes a rotating shaft and/or a rotation pinion or output gear. Output 50 may include more than one shaft, pinion, and/or gear, such as when motor assembly 46 includes more than one motor and/or when driven wheel assembly 28 includes more than one driven wheel. Motor assembly 46 may also be configured to power other moveable components on vehicle 10, such as depending on the form of the vehicle. For example, the motor assembly may be coupled to raise and lower the blade of a ride-on that resembles a bulldozer, the bucket of a ride-on that resembles a skid-steer or other loader, the bed of a ride-on that resembles a dump truck, etc.

Power for the motor assembly is provided by any suitable power source. An illustrative example of a suitable power source is a battery assembly 60. Battery assembly 60 includes at least one battery 62 that is adapted to provide power to the motor assembly. Any suitable type and number of batteries may be used in battery assembly 60. Although not required, the batteries are typically rechargeable batteries. For example, one or more six-, twelve-, eighteen-, or twenty-four-volt batteries have proven effective. An illustrative example of a battery assembly 60 is shown in FIG. 4. Also shown in FIG. 4 is a connector assembly 64 that is adapted to transmit power from the battery assembly to the motor assembly by providing an electrical connection between the battery assembly and the motor assembly, typically through the vehicle's wiring harness. Thus, the motor assembly is operably connected to the battery assembly by any suitable electrical connectors, such as cables, wires, or positive and negative terminals or leads, and the like. In the exemplary battery assembly shown generally in FIG. 4, the connector assembly includes a plug 66 that fits into a socket 68 that is electrically connected to the battery assembly. The battery assembly 60 may optionally include a charging jack 70 that is configured to receive a charging probe 72. The plug and probe connect to wires, or electrical cables, 74 that transmit electrical power from the battery assembly to the motor assembly. It is within the scope of the present disclosure that vehicle 10 may include any other suitable structure for conducting electrical power from the battery assembly to the motor assembly, with the battery assembly of FIG. 4 merely providing an illustrative example. For example, the battery assembly may include one or more batteries that include a connector that extends, typically via a wired connection, from the battery's housing instead of the internal socket 68 depicted in FIG. 4. Illustrative, non-exclusive examples of suitable batteries for children's ride-on vehicles are disclosed in U.S. Pat. No. 6,509,719, the complete disclosure of which is hereby incorporated by reference for all purposes.

In FIG. 3, drive assembly 30 is shown further including an optional motor output linkage 100 that mechanically interconnects the motor assembly with the driven wheel assembly. Motor output linkage 100 is any suitable mechanism that transmits the rotational input from the motor assembly's output(s) to the driven wheel assembly. Examples of suitable linkages 100 include an intermediate linkage between the output and the driven wheel assembly, such as a gearbox containing one or more gears, a belt or chain drive, a worm gear, one or more individual gears, and the like. The motor output linkage may be adapted to transmit the rotational input from the motor assembly to the driven wheel assembly at the same relative rate of rotation, or it may mechanically augment the rotational input to convey a greater or lesser rate of rotation relative to the rate of rotation of the output of the motor assembly. It is also within the scope of the disclosure that drive assembly 30 may be formed without motor output linkage 100, in which case the output(s) 50 of the motor assembly directly transmit the rotational input to the driven wheel assembly.

Drive assembly 30 also includes one or more user input devices 102 that are adapted to convey inputs from a child sitting on seat 18 to the drive assembly. User input devices 102 also may be referred to as user control devices. These devices convey a user's inputs via the vehicle's wiring harness 86, and affect the actuation of the motor assembly, such as by causing the actuation (or energization) of the motor assembly, selecting between a range of electronic configurations, selecting the direction of rotation of the motor assembly's output, selecting the relative degree of a maximum rate of rotation to which the motor assembly is actuated, etc. Examples of suitable devices 102 include a drive actuator 104, through which a user input directing the battery assembly to energize the motor assembly is received. Examples of suitable drive actuators 104 include an on/off switch, a foot pedal, a throttle lever, and a rotational handgrip on a steering mechanism that includes a handlebar. In FIG. 2, an example of a drive actuator 104 is shown in the form of a foot pedal 106 positioned for actuation by a child sitting on seat 18. When drive actuator 104 takes a form other than a foot pedal, it may be located in any suitable location within or near passenger compartment 14 so that a child sitting on seat 18 may reach the actuator while positioned to operate the vehicle. For example, an on/off switch or throttle may be located on the body or on the steering mechanism, such as illustrated at 108 in FIG. 2.

Other examples of user input devices 102 include a speed switch 110, which enables a user to select the relative rate of rotation of the motor assembly's output 50, and a direction switch 112, which enables a user to select the relative direction (i.e., clockwise or counterclockwise) of rotation of output 50 and thereby configure the vehicle to drive in forward and reverse directions. Switches 110 and 112 may be located in any suitable location on body 12 or steering assembly 26 for actuation by a child sitting on seat 18. An example of a suitable speed switch 110 is a switch that selectively configures a pair of batteries between series and parallel configurations to define relative "high" and "low" speed configurations. Speed switch 110 may additionally or alternatively selectively configure a pair of motors between series and parallel configurations. As a further example, the switches may convey inputs to a controller, such as subsequently described controller 114, which, responsive to inputs from the switches, configures the vehicle for a selected operating state.

Drive assembly 30 may (but is not required to) further include a controller 114, which is adapted to control electronically the transmission of the rotational input from the motor assembly to the driven wheel assembly. More specifically, controller 114 includes a microprocessor or suitable control circuit that is adapted to control the actuation, or energization, of the motor assembly by the battery assembly to regulate electronically the rotational input transmitted by the motor assembly to the driven wheel assembly. Controller 114 may regulate at least one of the timing and the ramp, or rate, of application of the transmission of the rotational input after actuation of a corresponding user input device by a child sitting on seat 18. In other words, the controller delays in at least time and/or rate of transmission the rotational input to the driven wheel assembly responsive at least in part to a user input selecting the desired, or selected, rotational input. An illustrative example of a suitable controller is disclosed in U.S. Pat. No. 6,771,034, the complete disclosure of which is hereby incorporated by reference for all purposes.

As shown in FIG. 2, body 12 also includes a battery compartment 120 that is adapted to receive battery assembly 60. The battery compartment may take any of a variety of different shapes, sizes, and configurations depending on such factors as the form of vehicle 10, the portion of the vehicle's body within which the compartment is formed, and the size and shape of battery assembly 60. FIG. 2 provides graphical illustrations of several suitable positions for battery compartment 120.

Referring again to FIG. 3, drive assembly 30 also includes a charge indicator assembly 140 that is adapted to assess a voltage input received by the charge indicator assembly from the battery assembly, which typically comprises at least one rechargeable battery 62. The input voltage generally corresponds to the voltage output by battery assembly 60, and therefore indicates the relative state of charge of the battery assembly. Rechargeable batteries normally exhibit a characteristic no-load terminal voltage that generally indicates the level of capacity to which the rechargeable battery has been charged, or discharged.

For example, a 12-volt rechargeable battery may comprise six lead-acid cells connected in series, which, when fully charged, exhibit a no-load open circuit terminal voltage of greater than 13.0 volts. As this exemplary rechargeable battery is discharged, the no-load open circuit terminal voltage will generally decrease to a level below the nominal 12.0 volt rating of the battery. Manufacturers of rechargeable batteries typically define the charging level that corresponds to a rapid drop-off in no-load open circuit terminal voltage as a 0% charging level. For a typical 12-volt rechargeable battery as described herein, the no-load open circuit terminal voltage corresponding to the 0% charging level may be as low as 11.8 volts.

A children's ride-on vehicle 10 employing this exemplary 12-volt rechargeable battery in battery assembly 60 may exhibit negative play characteristics when the charging level approaches this 0% charging level. For example, the vehicle may not accelerate to a top, or even moderate, speed, may have difficulty climbing hills, traversing uneven terrain, etc. Charge indicator assembly 140 is adapted to permit a child user, or the parent of a child user, of children's ride-on vehicle 10 to assess the no-load open-circuit terminal voltage of battery assembly 60, while the rechargeable battery assembly is installed in the vehicle and/or electrically connected to the vehicle's drive assembly. For example, the charge indicator assembly may include a visual display adapted to provide an indication of this voltage, such as within a plurality of predefined threshold voltage ranges.

Figure 5:
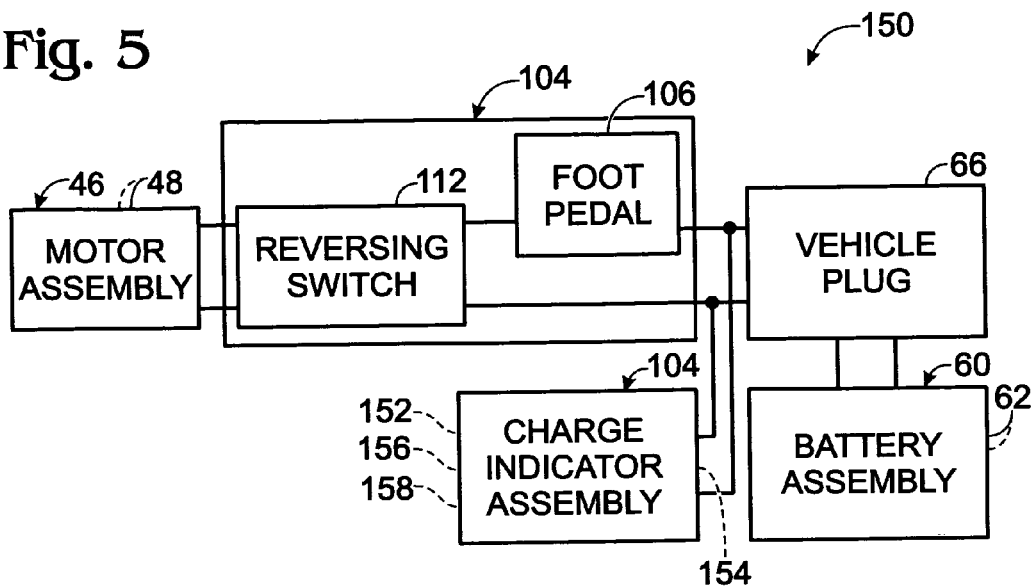
FIG. 5 is a schematic diagram of a suitable electrical system of the vehicle of FIG. 1.

In FIG. 5, an illustrative example of a suitable electrical system for vehicle 10 is shown at 150. As shown, electrical system 150 includes charge indicator assembly 140, motor assembly 46, one or more drive actuators 104, vehicle plug 66, and battery assembly 60 that is separably connectable to either vehicle plug 66 or a charging probe (not shown in FIG. 5). FIG. 5 shows two drive actuators 104, specifically foot pedal 106 and reversing switch 112, but any valid combination of drive actuators discussed herein are possible.

In the absence of drive inputs from the child user, a suitable drive actuator, such as foot pedal 106, is adapted to create an open circuit in electrical system 150. In this condition, the input to charge indicator assembly 140 may generally be the no-load open-circuit voltage of battery assembly 60. The input to charge indicator assembly 140 may also be the voltage output of battery assembly 60 under load conditions. This voltage, however, may not be directly representative of the remaining charge level in the battery assembly. Charge indicator assembly 140, optionally in combination with controller 114, may be adapted to convert a voltage under load conditions to an equivalent no-load open-circuit voltage, and display the converted value to a user.

Charge indicator assembly 140 generally includes an electronic circuit 152 or other suitable structure that is adapted to assess the voltage input 154 to the charge indicator assembly, and an indicator, or visual display, 156 adapted to provide an output 158 that is representative of input voltage 154 and/or the (relative) state of charge of the battery assembly. Output 158 of indicator 156 may be a visual display representative of input voltage 154, such as a series of LEDs (or other suitable lights or visual indicators) that illuminate at specific, or predetermined, threshold input voltages, a needle that is displaced on a dial responsive to the input voltage, a grouping of 7-segment LED display devices, etc. When LEDs are used, any suitable type, quantity and/or number of LEDs may be used. In some embodiments, it may be desirable to use "super bright" LEDs to that the illumination state of the LEDs are more readily visible in outdoor or other sunlit environments. Output 158 of indicator 156 may additionally or alternatively include an audible output, such as an audible tone that changes pitch or a rhythmic beat that changes frequency to reflect relative voltages of input 154. Charge indicator assemblies according to the present disclosure are integrated into or otherwise in electrical communication with the battery assembly and/or wiring harness of the vehicle, thereby enabling the charge indicator assembly to assess the relative state of charge of the battery assembly without requiring that the battery assembly be disconnected from the vehicle's wiring harness.

Figure 6:
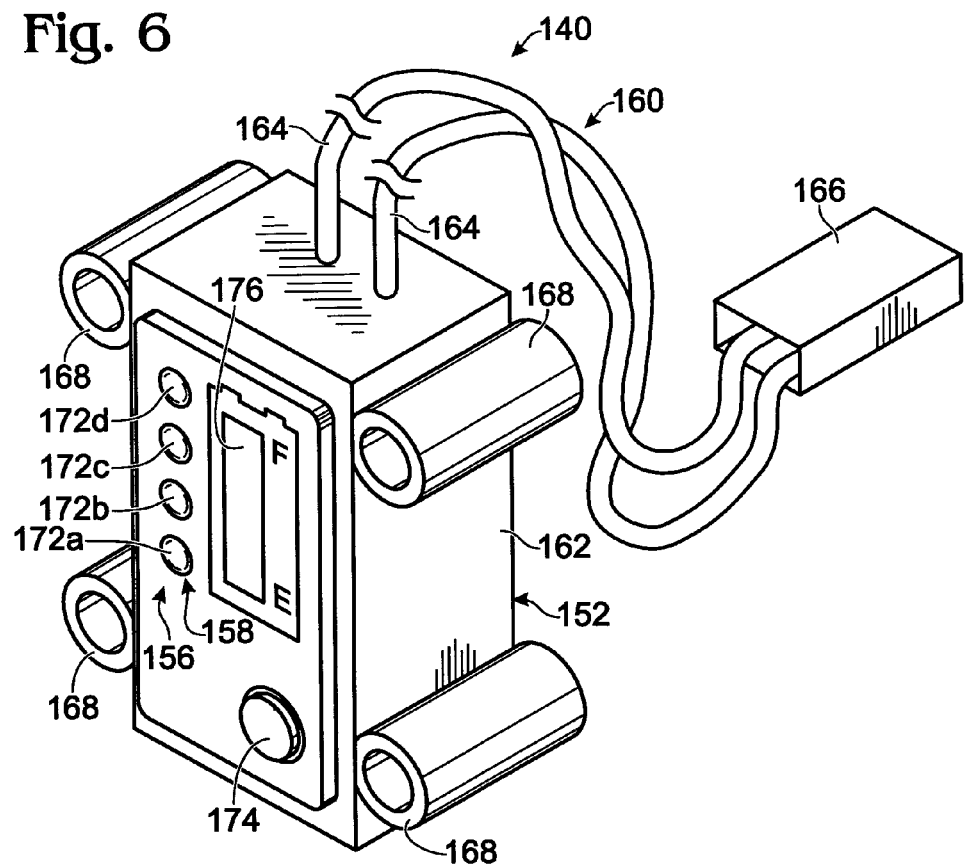
FIG. 6 is a perspective view of a charge indicator module that may be employed in connection with a children's ride-on vehicle.

FIG. 6 shows an illustrative, non-exclusive example of a charge indicator module 160 suitable for installation in children's ride-on 10 as a charge indicator assembly 140. As shown, charge indicator module 160 includes body 162, wires 164, and connector 166. Body 162 may include a plurality of couplers 168 that are adapted to mount charge indicator module 160 to body 12, such as to the exterior or interior surface thereof, using suitable fasteners such as screws, clips, or bolts. It is within the scope of the disclosure that module 160 may include a body that is integrally formed with the vehicle's body and/or that any other suitable mechanism or means may be used to secure the body to the ride-on. Wires 164 should be of appropriate length to allow connector 166 to be electrically coupled to the vehicle's wiring harness at a suitable location. Other means of connecting charge indicator module 160 to wiring harness 86 are within the scope of the present disclosure, such as a connector disposed on body 162 and the like.

As shown, charge indicator module 160 provides a visual display that is representative of the input voltage to, or received by, the module (or assembly) from the vehicle's battery assembly. Charge indicator module 160 may include an electronic circuit 152 that is adapted to selectively actuate one or more of a plurality of LEDs 172 to indicate the voltage, or relative voltage, of the voltage. Charge indicator module 160 includes an actuator that is disposed adjacent to the LEDs 172 or otherwise positioned in a suitable location for actuation by a user. When depressed, button 174 is adapted to cause charge indicator assembly 140 to switch between a first state where the output on LEDs 172 is representative of the input voltage of circuit 152 and a second state where the output on LEDs 172 is not representative of the input voltage of circuit 152. While four LEDs 172 are shown, any suitable number of LEDs, or any other illuminating devices, or any other suitable indicator 156, is within the scope of this disclosure.

Typical embodiments use at least three LEDs, which may (but are not required to) comprise LEDs of at least two different colors. For example, at least one LED may indicate an uncharged and/or low charge configuration, at least one LED may indicate a fully charged configuration, and at least one LED may indicate an intermediate charge configuration between the fully charged and low/uncharged configuration. The relative states of charge are determined by the charge indicator assembly responsive to the detected input voltage, such as by illuminating one or more LEDs or other visual indicators responsive to which of a series of predetermined voltage ranges the input voltage falls within. Similarly, while illustrated in FIG. 6 as a button, it is within the scope of the present disclosure that the actuator may be or include any suitable switch, slide, lever, toggle, or other mechanism adapted to selectively switch the charge indicator assembly between its first and second states.

In the absence of other drive inputs, the voltage of input 154 of circuit 152 typically represents the no-load open-circuit voltage of battery assembly 60. In the presence of drive inputs that would present a load on battery assembly 60, the input voltage represents the loaded terminal voltage of battery assembly 60, or, as discussed herein, charge indicator module 160 may work in conjunction with controller 114 to convert the loaded terminal voltage to an equivalent no-load open-circuit voltage that can be displayed on LEDs 172, or a suitable alternative.

Charge indicator module 160 may be adapted to switch to the first state when button 174 is depressed, and to automatically switch back to the second state when button 174 is released. It is within the scope of this disclosure for charge indicator module 160 to operate in the first state for a specified period of time after button 174 is released before switching back to operate in the second state. For example, assembly 160 may be adapted to remain in the first state for at least two seconds, at least five seconds, or longer, after button 174 (or another suitable actuator) is released. It is also within the scope of this disclosure for the charge indicator module 160 to be adapted to switch between the first state and the second state at fixed, or predetermined, time intervals, without a button 174 to initiate the switch, and/or whenever the at least one input device receives inputs from the child user.

Charge indicator module 160 may, but is not required to, also include graphics 176 that may assist the user in understanding the meaning of the display of charge indicator module 160. In FIG. 6, graphic 176 includes the letters "E" and "F", which are typically used on automobile fuel tank gauges to indicate the "empty" and "full" states of the automobile's fuel tank. It is within the scope of the present disclosure that other suitable graphic indicators may be used, such as other textual indicators and/or pictorial indicators. Accordingly, as one or more of the LEDs or other indicators are illuminated, the relative range of charge states defined by the display (i.e., the position of the illuminated LED(s) along this range) provides a visual indication of the relative state of charge of the battery assembly.

As discussed, charge indicator module 160 is typically mounted to body 12 of children's ride-on 10. Charge indicator module 160 may be mounted in a location visible to a child sitting in seat assembly 16, such as within instrument panel 130, or, alternatively, in a location where it may be visible to a parent of the child user, such as within battery compartment 120.

Figure 7:
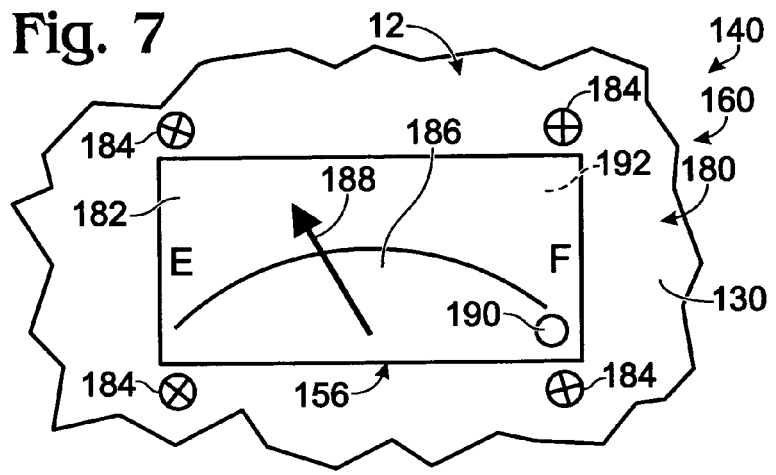
FIG. 7 is a fragmentary view of another exemplary charge indicator module that may be employed in connection with a children's ride-on vehicle.

FIG. 7 shows at 180 another illustrative example of a suitable charge indicator assembly 140 in form of a charge indicator module 160 for use with children's ride-on vehicles according to the present disclosure. As shown, module 180 is depicted as being installed in, or on, a portion of the ride-on vehicle's body, such as in instrument panel 130. Charge indicator module 180 generally includes a body 182 that is fastened to instrument panel 130 using a plurality of screws or other suitable fasteners 184. The visual display of charge indicator module 180 includes a visual display 156 having a dial 186 and a needle 188. When button 190 is depressed in the absence of other drive inputs, needle 188 may move to a location on dial 186 that is representative of the input voltage 154 of charge indicator module 180, as assessed by electronic circuit, or other suitable detection structure, 192.

Figure 8:
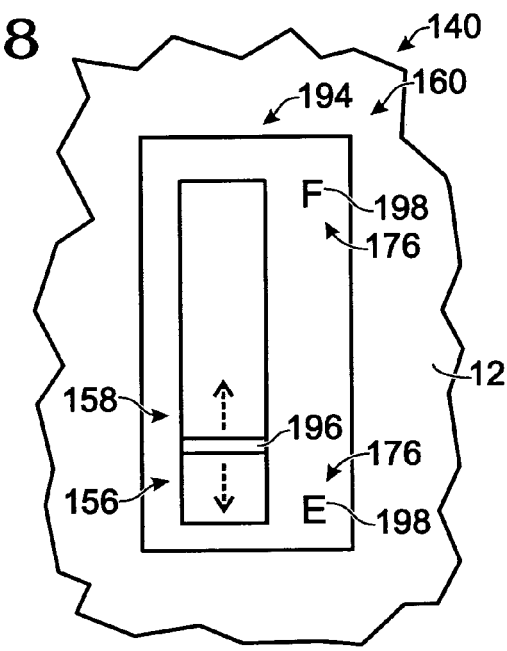
FIG. 8 is a fragmentary view of another exemplary charge indicator module that may be employed in connection with a children's ride-on vehicle.
Figure 9:
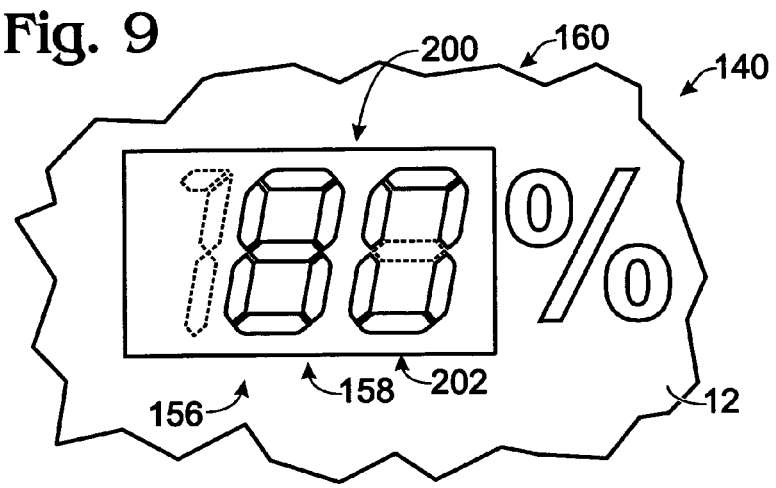
FIG. 9 is a fragmentary view of another exemplary charge indicator module that may be employed in connection with a children's ride-on vehicle.

Additional illustrative examples of charge indicator modules 160 are shown in FIGS. 8 and 9 at 194 and 200, respectively. In FIG. 8, the charge indicator module includes a visual display 156 in the form of a illuminable range along which an output 158, such as indicator 196, may be illuminated to represent the relative state of charge of the ride-on's battery assembly. Also shown at 198 in FIG. 8 are graphics 176 that respectively indicate the upper and lower thresholds of the range of relative charge of the battery assembly. In FIG. 9, the charge indicator module includes a visual display 156 in the form of a numerical display 202 in which an output 158 in the form of an illuminated number may be displayed to indicate the relative state of charge of the battery assembly.

Figure 10:
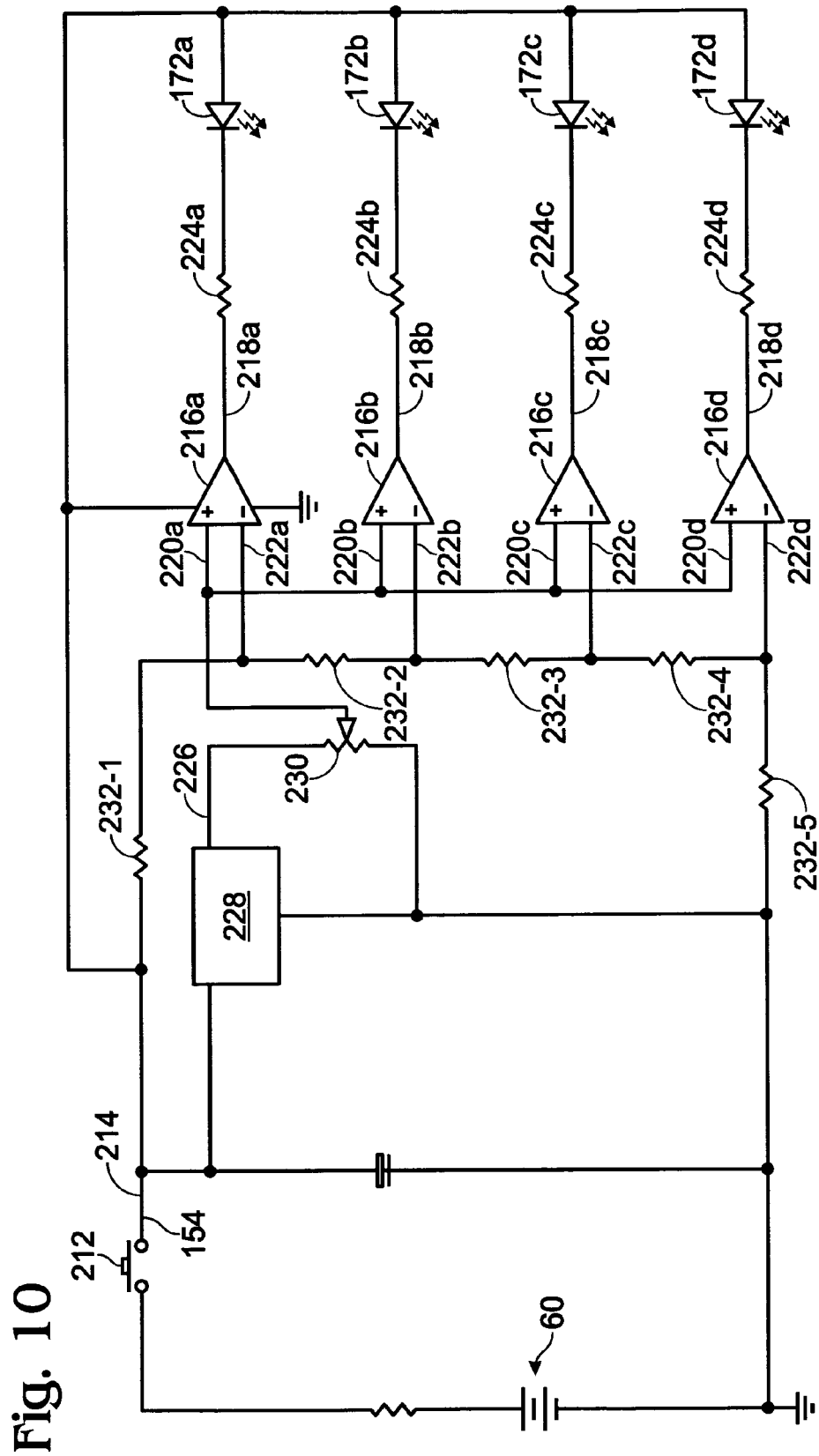
FIG. 10 is a schematic diagram of an exemplary circuit employed within a suitable charge indicator module that may be employed in connection with a children's ride-on vehicle.

FIG. 10 shows a circuit diagram of an illustrative embodiment 210 of a suitable electronic circuit 152 for charge indicator modules 160 and/or assemblies 140 according to the present disclosure. As shown, circuit 210 includes battery assembly 60 and includes a switch 212 that is typically actuated by button 174, or another suitable actuator. Switch 212 is adapted to energize circuit 210 to illuminate one or more LEDs 172 or other suitable visual output, depending on the voltage of circuit input 214, which generally represents input 154 to charge indicator module 160. Circuit 210, as shown, includes four operation amplifiers, or op-amps, 216, which correspond to four LEDs 172. As discussed, the number of LEDs, and correspondingly the number of op-amps, may vary within the scope of the present disclosure, such as to include a greater or lesser number of one or more of these structures. Typically, each op-amp will be associated with at least one LED, with the op-amp and corresponding circuit components defining a threshold voltage against which the input voltage is compared and above which, or optionally below which, the corresponding LED will be illuminated. The output 218 of an op-amp is proportional to the difference in voltage between positive input 220 and negative input 222. As shown in FIG. 10, the outputs 218 of op-amps 216 will be ground, or 0 volts, if the voltage of positive inputs 220 are less than the voltage of negative inputs 222. Conversely, outputs 218 will represent the circuit input 214 if the voltage of positive inputs 220 is greater than the voltage of negative inputs 222.

In circuit 210 as shown, LEDs 172 are in a "normally illuminated" state, and will turn off if the voltage potential of outputs 218 of op-amps 216 is driven to the circuit input voltage 214 by op-amp 216. Circuit 210 may include resistors 224 in order to control the current through LEDs 172. Accordingly, the resistance of each resistor 224 will be determined by the expected magnitude of input voltage 214, which will generally reflect the terminal voltage of battery assembly 60, and the current carrying capacity of each LED 172. It is within the scope of the disclosure that the number of resistors and individual resistance thereof may vary without departing from the scope of the present disclosure.

As shown in FIG. 10, positive inputs 220 are a potential reference determined by the output 226 of voltage regulator 228 and the settings of variable resistor 230. Also shown in FIG. 10, negative inputs 222 are a signal determined by circuit input 214 and the several voltage dividers formed by the resistors 232. For a typical positive input voltage 220, negative inputs 222 will carry a sequence of decreasing potentials with negative input 222a carrying the highest potential, and negative input 222d carrying the lowest. Op-amps 216 will then turn off LEDs 172 at a decreasing sequence of threshold voltages of negative inputs 222, with negative input 222a carrying the lowest threshold and negative input 222d carrying the highest threshold. As discussed, the number and magnitude of the threshold voltages may vary depending upon a variety of factors, including the selected number of thresholds to be utilized, design preferences, etc. As an illustrative example, when four thresholds are selected, these thresholds may correspond to the battery's rated capacity, above 80% of the battery's rated capacity, above 50% of the battery's rated capacity, and 50% or less of the battery's rated capacity. Another illustrative example is 100% of capacity, 50-90% of capacity, 10-50% of capacity, and 0-10% of capacity. These exemplary sets of thresholds are for illustrative purposes only, as the number and boundaries of the thresholds may vary substantially from this example without departing from the scope of the present disclosure.

A circuit designer may choose components for voltage regulator 228 and variable resistor 230, along with resistors 232 to provide a desired reference voltage at the positive inputs 222 to determine the sequence of thresholds. Moreover, the designer may choose to use multiple individual resistors for resistors 224 and 232 in order to achieve a desired resistance value and tolerance. Specifically, for a typical 12-volt lead-acid battery, components may be chosen and set to turn off LED 172a at a circuit input voltage 214 of less than 11.8 volts, to turn off LED 172b at a circuit input voltage 214 of less than 12.1 volts, to turn off LED 172c at a circuit input voltage 214 of less than 12.6 volts, and to turn off LED 172d at a circuit input voltage 214 of less than 13.1 volts. As discussed, battery assembly 60 may include one or more batteries and these batteries may have rated voltages other than 12 volts, such as 6 volts, 18 volts, 24 volts, etc. It is within the scope of the present disclosure to utilize assembly 160 with these batteries as well, with corresponding voltage thresholds.

Other embodiments of circuit 152 may light each LED 172 in a specific range of circuit input voltage 214. The specific ranges of circuit input voltage may overlap such that multiple LEDs 172 may be illuminated simultaneously, or ranges may be discrete such that one LED 172 may be illuminated at a time. Other embodiments of circuit 152 may drive other indicators that may show a continuously varying output representative of input voltage 214, such as the needle and dial display of FIG. 7, or an audible indicator.

INDUSTRIAL APPLICABILITY

The present disclosure is applicable to battery-powered children's ride-on vehicles with battery-powered motor assemblies.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:
1. A children's ride-on vehicle, comprising:
a body having at least one seat sized for a child;
a plurality of wheels rotatably coupled to the body, wherein the plurality of wheels includes at least one steerable wheel and at least one driven wheel;
a steering assembly comprising a steering mechanism adapted to receive steering inputs from a child sitting on the at least one seat, and a steering linkage adapted to convey the steering inputs to the at least one steerable wheel;

a drive assembly adapted to selectively drive the rotation of the at least one driven wheel, wherein the drive assembly comprises:
  a motor assembly comprising at least one electric motor,
  at least one user input device positioned to receive inputs from a child sitting on the at least one seat and adapted to actuate the motor assembly, and
  a battery assembly adapted to selectively energize the motor assembly and including at least one battery; and a charge indicator assembly in communication with the drive assembly and adapted to selectively receive an input voltage from the battery assembly, the charge indicator assembly comprising:
  an electronic circuit adapted to assess an input voltage to the circuit, and
  an indicator adapted to provide an output representative of the input voltage, the indicator including a visual display disposed on the body in a location visible to the child sitting in the at least one seat.

2. The children's ride-on vehicle of claim 1, wherein each of the at least one batteries is a rechargeable battery.

3. The children's ride-on vehicle of claim 1, wherein the visual display is adapted to display discrete ranges of outputs representative of the input voltage.

4. The children's ride-on vehicle of claim 1, wherein the visual display comprises at least one LED.

5. The children's ride-on vehicle of claim 4, wherein the charge indicator assembly electronic circuit is adapted to illuminate a plurality of LEDs, each at a specific threshold input voltage.

6. The children's ride-on vehicle of claim 5, wherein the plurality of LEDs includes at least three LEDs.

7. The children's ride-on vehicle of claim 5, wherein the plurality of LEDs includes LEDs of at least two different colors.

8. The children's ride-on vehicle of claim 4, wherein the charge indicator assembly electronic circuit is adapted to illuminate a plurality of LEDs, each within a predetermined range of input voltages.

9. The children's ride-on vehicle of claim 1, wherein the vehicle body further includes a battery compartment adapted to receive the battery assembly.

10. The children's ride-on vehicle of claim 1, wherein the charge indicator assembly further includes an actuator that is adapted to switch the charge indicator assembly between a first state where the indicator output is not representative of the input voltage and a second state where the indicator output is representative of the input voltage.

11. The children's ride-on vehicle of claim 10, wherein the actuator is disposed adjacent the visual display.

12. The children's ride-on vehicle of claim 10, wherein the charge indicator assembly is adapted to operate in the second state only when the actuator is pressed.

13. The children's ride-on vehicle of claim 10, wherein the charge indicator assembly is adapted to operate in the second state for a period of time after the actuator is pressed.

14. The children's ride-on vehicle of claim 1, wherein the charge indicator assembly is adapted to switch at fixed time intervals between a first state where the indicator output is not representative of the input voltage and a second state where the indicator output is representative of the input voltage.

15. The children's ride-on vehicle of claim 1, wherein the charge indicator assembly is adapted, when the at least one input device receives inputs from the child sitting in the at least one seat, to switch between a first state where the indicator output is not representative of the input voltage and a second state where the indicator output is representative of the input voltage.

16. A children's ride-on vehicle, comprising:
a body having at least one seat sized for a child;
a plurality of wheels rotatably coupled to the body, wherein the plurality of wheels includes at least one steerable wheel and at least one driven wheel;
a steering assembly comprising a steering mechanism adapted to receive steering inputs from a child sitting on the at least one seat, and a steering linkage adapted to convey the steering inputs to the at least one steerable wheel;
a drive assembly adapted to selectively drive the rotation of the at least one driven wheel, wherein the drive assembly comprises:
  a motor assembly comprising at least one electric motor,
  at least one user input device positioned to receive inputs from a child sitting on the at least one seat and adapted to actuate the motor assembly, and
  a battery assembly adapted to selectively energize the motor assembly and including at least one rechargeable battery; and
a charge indicator assembly in communication with the drive assembly, the charge indicator assembly comprising:
  an electronic circuit adapted to assess an input voltage to the circuit from the battery assembly,
  a visual indicator disposed on the body in a location visible to the child sitting in the at least one seat, and adapted to display an output representative of the input voltage, and
  an actuator disposed on the body adjacent the indicator and accessible to a child sitting in the at least one seat, the actuator being adapted to actuate the electronic circuit and the visual indicator.

17. The children's ride-on vehicle of claim 16, wherein the visual indicator includes a plurality of LEDs.

18. The children's ride-on vehicle of claim 17, wherein the plurality of LEDs includes LEDs of more than one color.

19. The children's ride-on vehicle of claim 17, wherein the electronic circuit is adapted to illuminate each of the LEDs upon detection of a specific and different threshold input voltage.

* * * * *